United States Patent [19]
Lewis

[11] Patent Number: 5,838,793
[45] Date of Patent: Nov. 17, 1998

[54] CONTROLLING MOVEMENT OF OWNED PARTS

[75] Inventor: David Otto Lewis, Rochester, Minn.

[73] Assignee: International Business Machines Corporation, Armonk, N.Y.

[21] Appl. No.: 629,980

[22] Filed: Apr. 9, 1996

[51] Int. Cl.[6] ............... H04K 1/00; H04L 9/00; G07D 7/00

[52] U.S. Cl. ............... 380/25; 380/9; 380/49; 340/825.34

[58] Field of Search .............. 380/9, 25, 49; 340/825.34

[56] References Cited

U.S. PATENT DOCUMENTS

| | | |
|---|---|---|
| 5,006,843 | 4/1991 | Hauer . |
| 5,229,648 | 7/1993 | Sues et al. . |
| 5,237,609 | 8/1993 | Kimura . |
| 5,245,330 | 9/1993 | Wassink . |
| 5,267,311 | 11/1993 | Bakhoum . |
| 5,297,268 | 3/1994 | Lee et al. . |
| 5,510,992 | 4/1996 | Kara . |
| 5,606,507 | 2/1997 | Kara . |
| 5,686,759 | 11/1997 | Hyde et al. ............... 257/730 |

*Primary Examiner*—Stephen C. Buczinski
*Attorney, Agent, or Firm*—Merchant, Gould, Smith, Edell, Welter & Schmidt

[57] ABSTRACT

A method and apparatus for controlling the movement of owned computer parts to prevent theft of the computer parts for use in a different computer system. A code is defined to identify an owner of a system or group of systems, and this code is programmed into non-volatile memory located on the systems and parts belonging to that owner. The system software automatically does a comparison of all parts in the system to ensure that the code on each part is compatible with that on the system. A given computer part will not function if it is installed into a system which does not have a code compatible with that of the part. This invention makes stolen parts useless, and knowledge of the existence of this invention is a theft deterrent. The owner can choose to change this code periodically by entering the value of the previous code. Also, the owner can activate or deactivate the security for a particular part by resetting a bit in the code field of that particular part, which can only be done if the part security code is compatible with the system security code. If this enabling bit is not set, the comparison will not be done and the part will work on any system.

18 Claims, 8 Drawing Sheets

(Preferred Embodiment)

(Preferred Embodiment)

(Preferred Embodiment)

(System)

(System)

(FRU)

(Comparison Software Flowchart)

(User Control Flowchart)

CONTROLLING MOVEMENT OF OWNED PARTS

BACKGROUND

The present invention relates to the field of computers and systems security. Specifically this invention is adapted to allow a system to function only with parts designated for that system, in order to prevent theft of replaceable computer parts.

Theft of expensive parts from leased computers or from computers left unattended has become an increasing problem in recent years. In the past, computers were placed in secured rooms or buildings with limited access to the parts. As computers become cheaper, they have been moved into areas where many more people have access to them. Because it is easy to remove interchangeable parts, such as memory and I/O cards, from one machine to use in another machine, it is difficult to prevent the theft of the parts.

Companies that lease computer equipment have an even bigger problem. Instances have occurred where the machines are delivered to a lessee and are immediately stripped of all the interchangeable parts, and these parts are sold separately for a profit. The lessee then often repopulates the machine with old or broken parts and terminates the lease, leaving the lessor with a useless machine. By the time the lessor discovers the loss, the lessee has disappeared or filed for bankruptcy.

The conventional solution being used to try to control access to computer parts is to record serial numbers of the parts and the machines and, when doing maintenance on the machine, check the parts against what was in the machine initially. Unfortunately, if theft occurs, the loss is not discovered at an early enough stage for any measure of crime prevention. Another problem with serial number tracking is that parts are often moved from one machine to another by service personnel, and there is no history of the movement of the parts. Hence, it is impossible to tell if the parts have been stolen or simply misplaced. Also, nothing in this method prevents stolen parts from being used in different computer systems.

Another solution currently being used is to physically lock the parts into the machine enclosure. However, this causes problems when the customer wants to add additional parts or cables to the system or to even do maintenance on the system. Customers also do not like such machine locks, because they must keep track of keys to the system, and these keys can be easily copied.

Thus, there is a need for an improvement in the attainment of computer network security so that expensive computer parts cannot be stolen and used in other systems.

SUMMARY

The present invention is directed to an apparatus and method for controlling movement of owned computer parts. Specifically, owned computer parts are identified such that they will only function in one or more computer systems identified to the same owner.

The present apparatus invention comprises a non-volatile memory device located on each of a plurality of replaceable computer parts. Each non-volatile memory device contains a part security code field. The apparatus further comprises a non-volatile system memory device located on the computer system. The system memory device contains a system security code field. The apparatus further comprises a means for comparison of each part security code field and the system security code field, allowing the system to function with any particular one of the plurality of replaceable computer parts only if a value stored in the particular one part security code field is compatible with a value stored in the system security code field.

The present invention provides a method for preventing theft of replaceable computer parts. This method includes the step of storing a part security code along with an enable bit in a non-volatile memory located on each of a plurality of replaceable computer parts. This method further includes the step of storing a system security code in a non-volatile computer system memory. The next step compares the part security codes with the system security code if the enable bit is set. The final step allows the computer system to function with any particular one of the plurality of replaceable computer parts only if the part security code of the particular one part is compatible with the system security code.

Thus, this invention prevents theft of computer parts by allowing them to work only in computer systems which have a compatible security code with the part. There will be no incentive to steal parts if they are useless in other systems. In addition, if one owner has multiple systems, parts can be exchanged among these systems as long as the system security codes in the systems are compatible.

BRIEF DESCRIPTION OF THE DRAWINGS

These and other features, aspects and advantages of the present invention will become better understood with regard to the following description, appended claims, and accompanying drawings where:

DETAILED DESCRIPTION

Figure 1A:
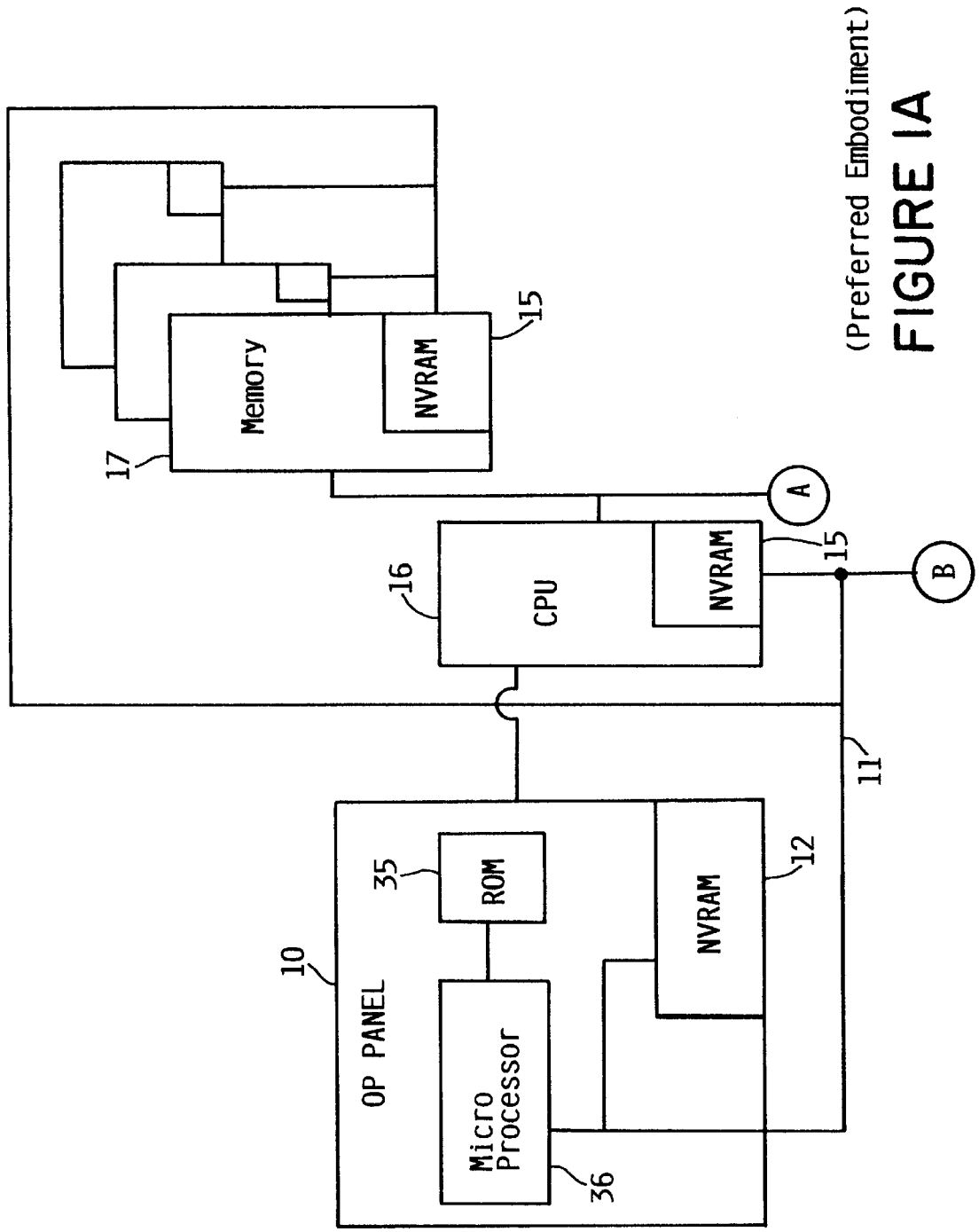
FIG. 1 is a preferred embodiment of an apparatus showing a computer system.
Figure 1B:
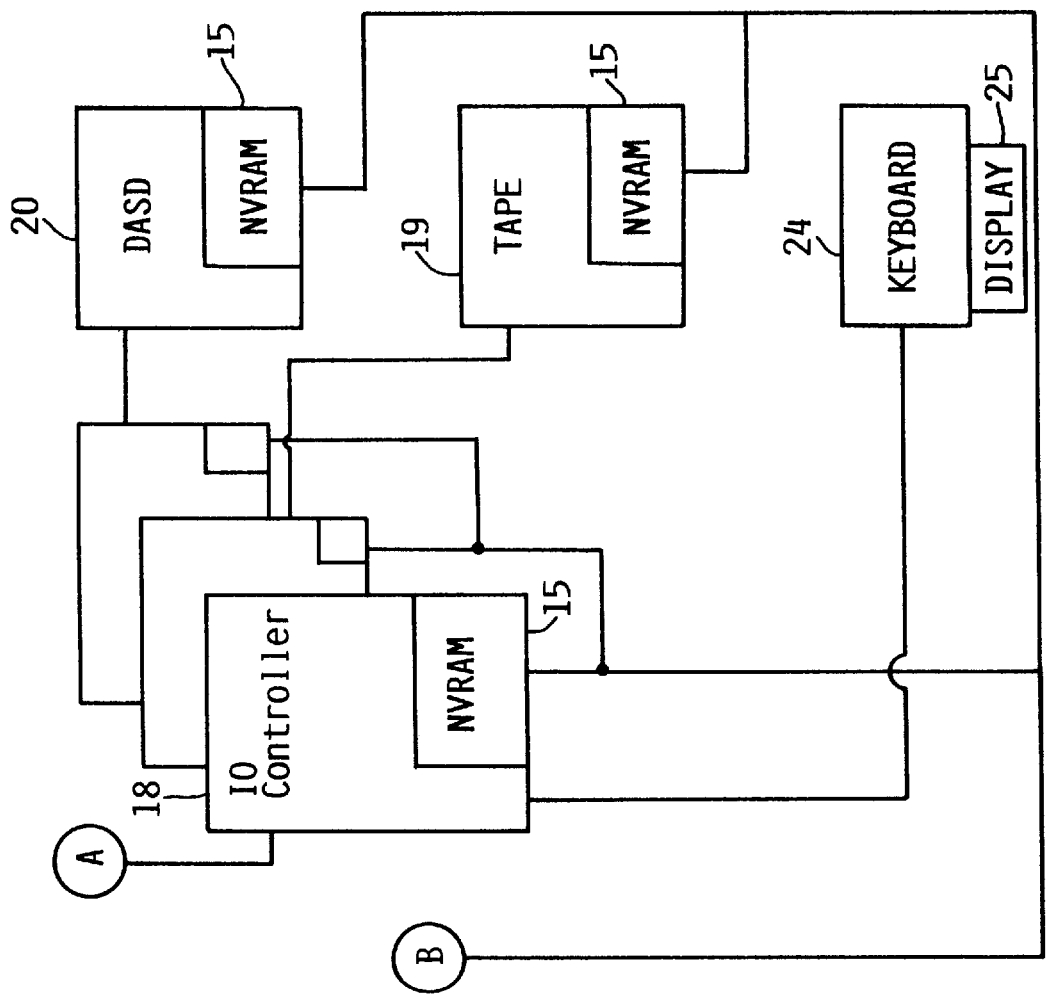

FIG. 1 is a preferred embodiment of the invention showing a block diagram of a computer system. This invention is directed to controlling the movement of owned computer parts, by preventing the use of computer parts in any system unless the security code of the part is compatible with the security code of the computer system. This invention, in further embodiments, controls movement of owned parts in other systems, not limited to only computer systems.

When it is said that the codes must be compatible, this means that the system must recognize the code in the part in some manner. In the preferred embodiment, the codes of the part and the system must be the same to be compatible.

Figure 2A:
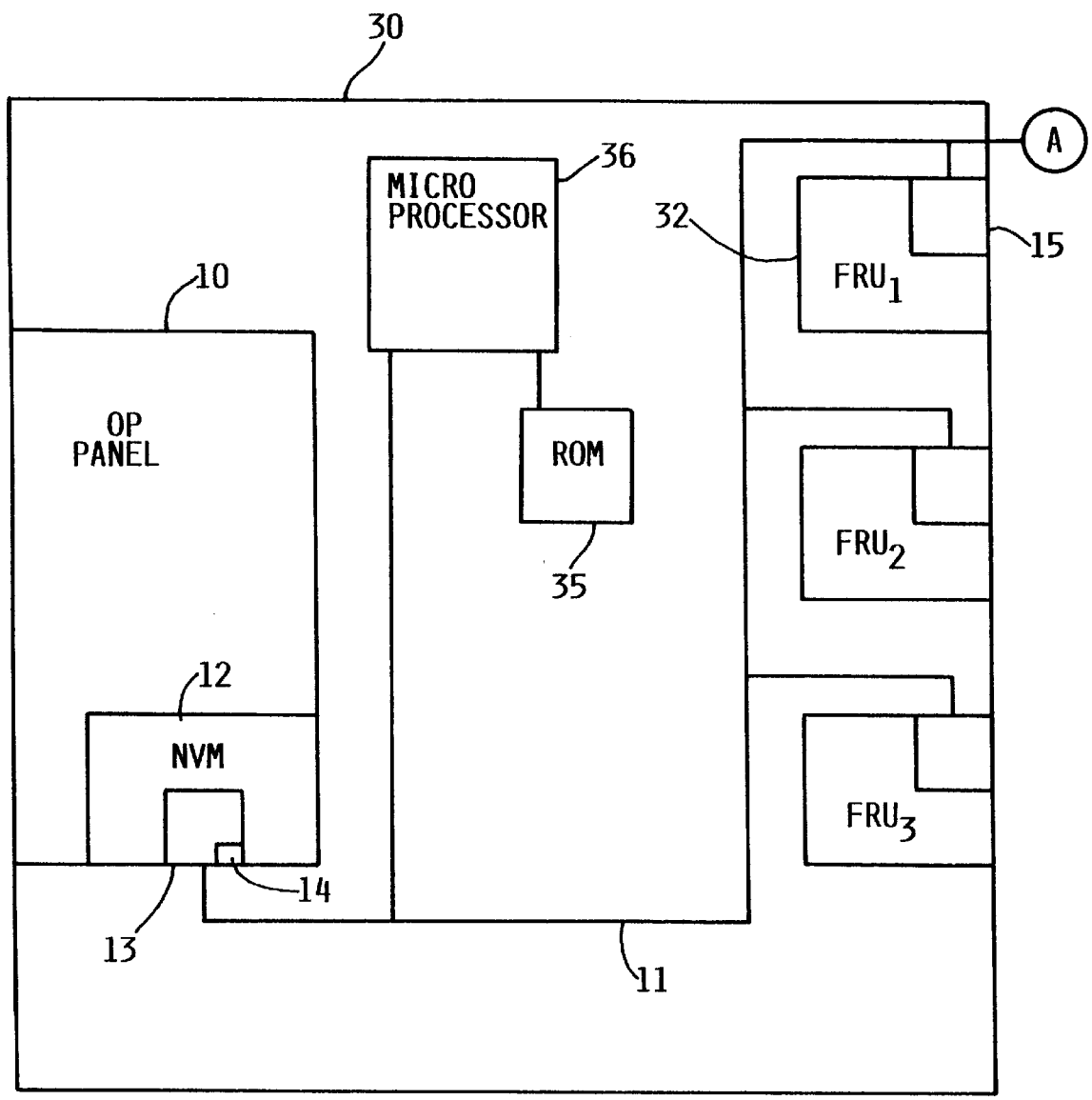
FIG. 2 is a system view showing the use of a computer program to compare security codes of the system and security codes of the parts.
Figure 2B:
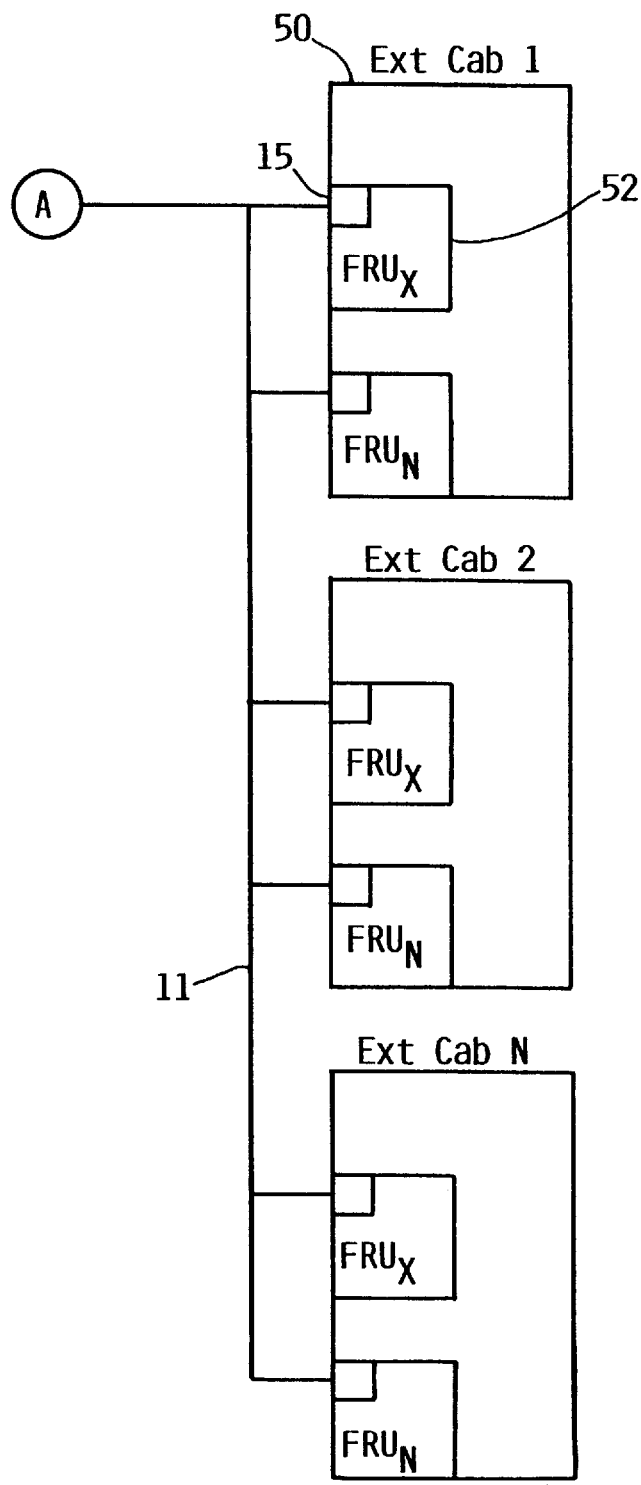

In FIG. 1, the system control center for the security system shown is an operation panel 10. The operation panel 10 contains a microprocessor 36 and Read Only Memory 35 for sequencing the system power supplies on and off as well as controlling the configuration of the various devices attached to the system. The operation panel 10 has non-volatile memory 12. Within the operation panel non-volatile memory 12, there is a storage location which holds a system security code 13, as shown in FIG. 2. In a further embodiment of the invention, the non-volatile memory also holds a system enabling bit 14. The storage location for the system security code 13 preferably holds 8 to 16 bytes of data, but could hold any number of bytes. The storage location for the system enabling bit 14 is preferably a single bit, but could be any number of bits.

In the preferred embodiment the operation panel 10 operates software contained in Read Only Memory 35 that executes on a microprocessor 36 to do the security checking and allows user control of security code values. Operation panel 10 typically interfaces to non-volatile memory 15 of all coded field replaceable units using a serial interface 11. In further embodiments, other processor platforms can be used to control the security codes.

Figure 3:
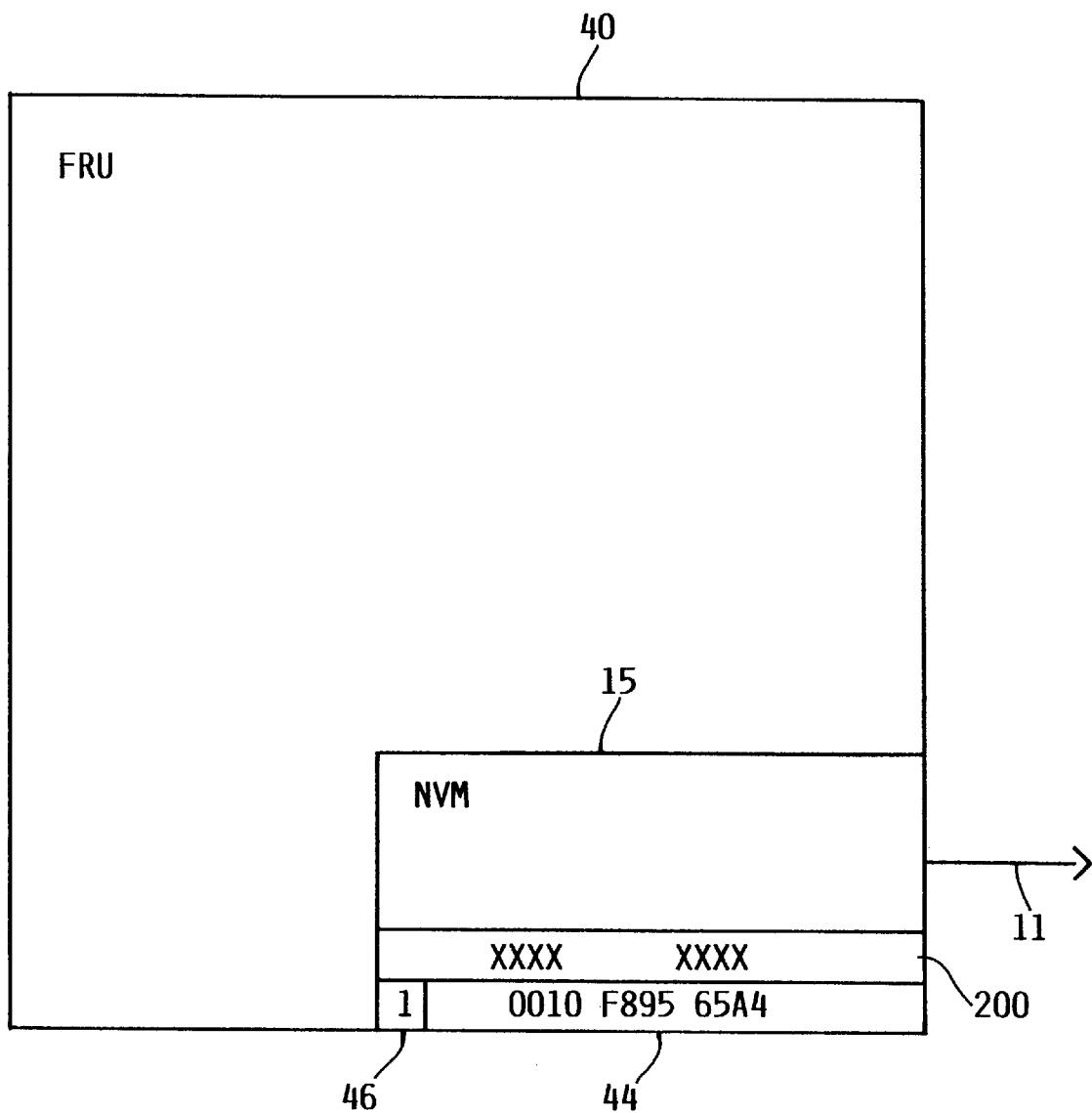
FIG. 3 is an enlarged view of FIG. 2, showing an individual computer part and its memory for security code storage.

For the purposes of the present application, a field replaceable unit (FRU) is a term used to refer to a computer part or group of parts which can be replaced. In FIG. 1, field replaceable units may include, but are not limited to, a Central Processing Unit (CPU) 16, one or more memory cards or units 17, one or more Input/Output (I/O) controller cards or units 18, one or more hard disk units 20, and one or more tape storage units 19. Each coded field replaceable unit contains non-volatile memory 15 for storing a field replaceable unit security code 44, as shown in FIG. 3. In a further embodiment of the invention, the non-volatile memory locations 15 also stores a field replaceable unit enabling bit 46.

FIG. 2 shows a block diagram of an alternative computer system embodying the invention. Software in Read Only Memory 35 controls the apparatus by means of the microprocessor 36 through a serial interface 11 with the system non-volatile memory 12 containing the system security code 13 and enabling bit 14, and with the field replaceable unit's non-volatile memory. Field replaceable units are shown generically. Some field replaceable units 32 with non-volatile memory 15 reside within the system housing 30, and some field replaceable units 52 with non-volatile memory 15 reside in external cabinets 50.

FIG. 3 is an enlarged view of a generic field replaceable unit 40. This is representative of all field replaceable units mentioned above. The field replaceable unit contains non-volatile memory 15. In a hard disk storage unit 20 of FIG. 1, this non-volatile memory simply may be designated storage on the disk. Other field replaceable units however may require additional storage area for this purpose, in which case Flash or Electrically Erasable Programmable Read Only Memory storage or similar memory is suitable, but not exclusively required.

In FIG. 3, the non-volatile memory 15 has locations shown for the field replaceable unit's security code 44. In an alternative embodiment, the non-volatile memory 15 also has a location for a field replaceable unit enabling bit 46. The security code location 44 preferably stores 8 to 16 bytes of information, but could store any number of bytes. The enabling bit location is usually, but not necessarily, adjacent to the security code location 44, and consists preferably of one bit of storage but could consist of any number of bits of storage.

Figure 4:
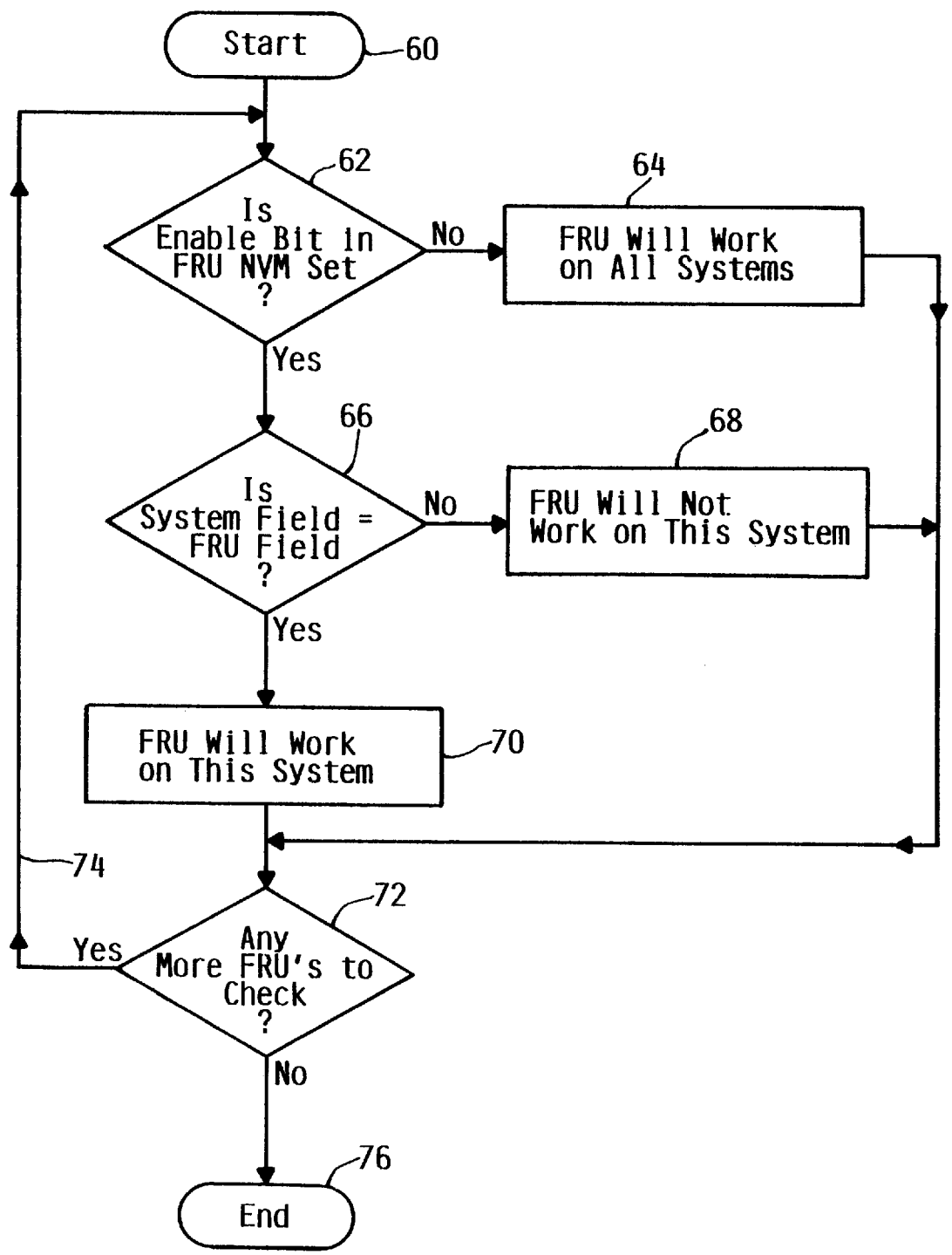
FIG. 4 is a flow chart of a preferred method used to compare security code values.

FIG. 4 shows a flow diagram for software used in one embodiment of the method for comparing security codes. This embodiment utilizes enabling bits on the field replaceable units, which may be used to disable the security for a particular part, so that a part may be temporarily loaned to a system with a different security code. This software shown in FIG. 4 checks the security code of all field replaceable units in the system, obtained via serial interface 11, so that units with improper values of the security code, such as stolen units, cannot function in the system. The method begins with start step 60, which is activated upon powering up the system or upon adding a field replaceable unit, which often is appropriate since modern computer systems allow hot-plugging, or addition/replacement of computer parts, while the system is powered on.

The next step in FIG. 4 is decision step 62, which checks a field replaceable unit 40 to determine whether the enabling bit 46 on that particular unit's non-volatile memory 15 is set. If the enabling bit 46 on the unit is not set, the field replaceable unit will function with this or any system, as shown in step 64. The security check for the unit will thus be bypassed, and the next field replaceable unit, if any exist, will be checked in step 72.

If the enabling bit 46 on the unit is set, the software will compare the system security code 13 found in non-volatile memory 12 with the field replaceable unit security code 44, shown at decision step 66. If the field replaceable unit security code 44 is not compatible with the system security code 13, this field replaceable unit 40 will not be identified to or configured in the system, as shown in step 68. Therefore, this field replaceable unit will not function with this system and the software next checks additional field replaceable units in step 72.

If the field replaceable unit security code 44 is compatible with the system security code 13, this field replaceable unit 40 will be identified to the system and will function properly for its intended purpose in this system, as shown in step 70. The software then checks in decision step 72 to determine if any additional field replaceable units exist and are connected to the system. If not, the program ends at step 76. If additional field replaceable units exist, the program proceeds along flow line 74 to return to step 62, where the additional field replaceable units are examined in the above manner. In this way, all of the field replaceable units attached to the system can be checked, which is an advantageous aspect of the invention in such a preferred embodiment.

Figure 5A:
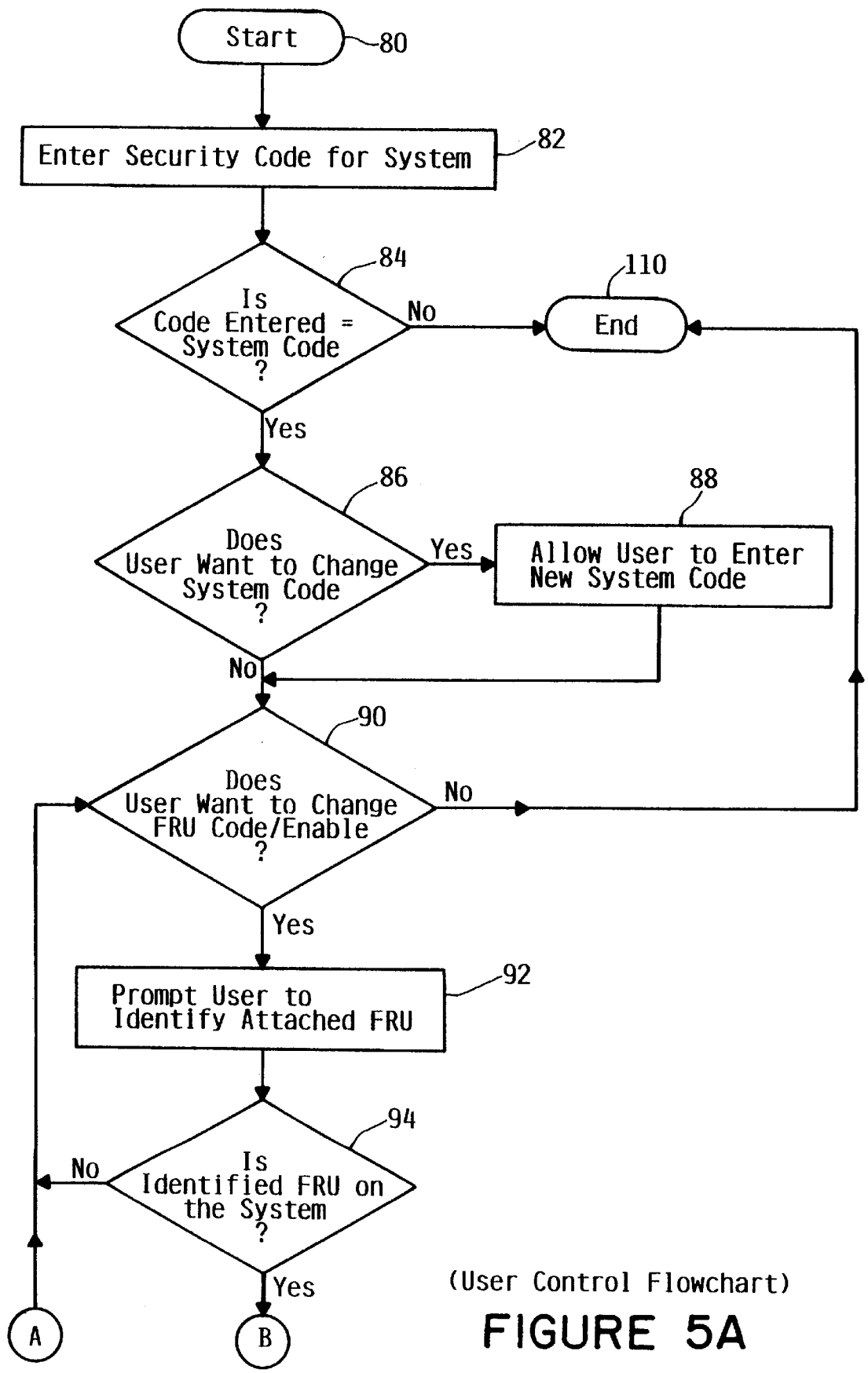
FIG. 5 is a flow chart of a preferred method used to change the security code on a computer part or system, or to disable the security check for a given computer part or system.
Figure 5B:
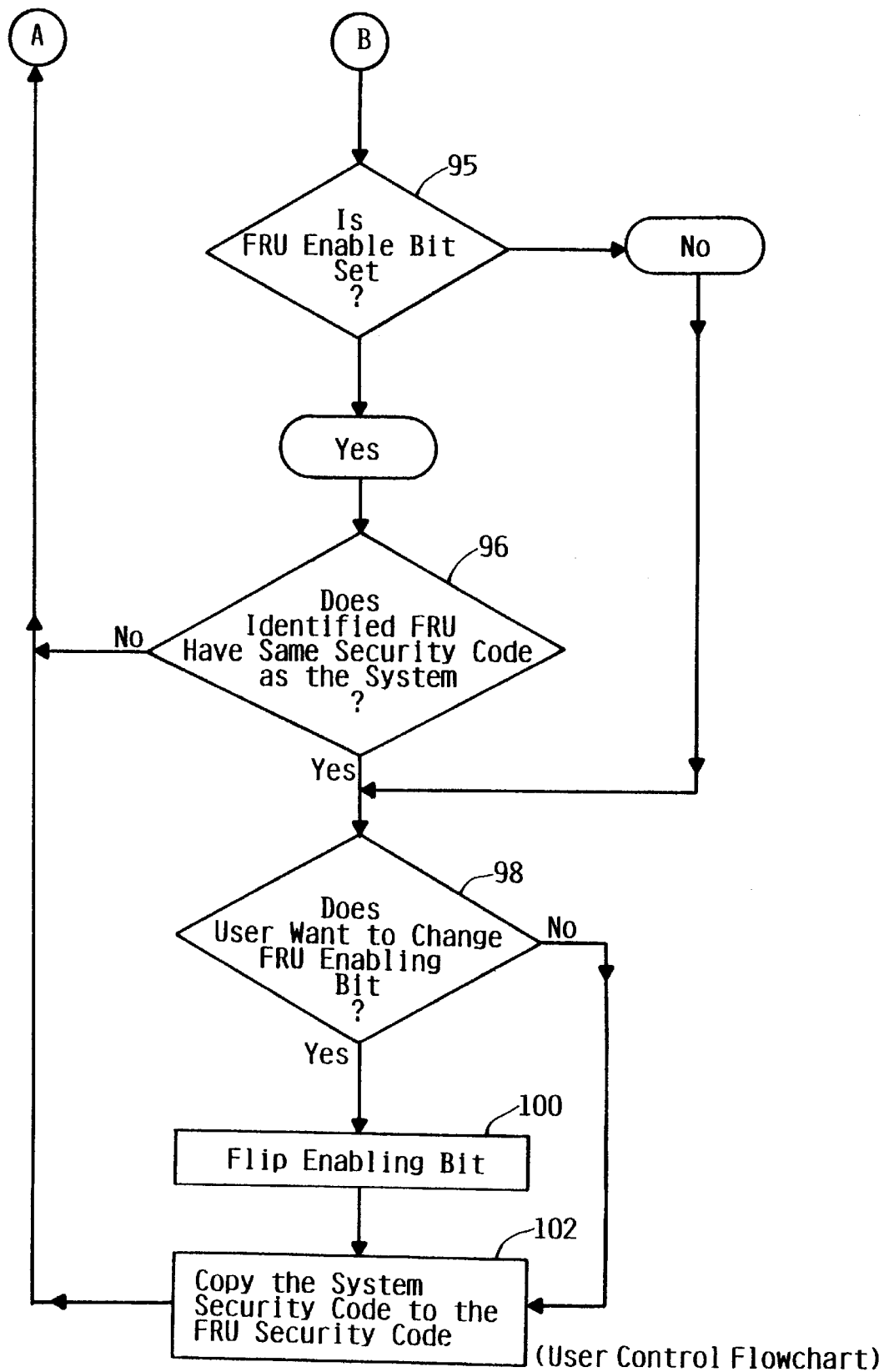

FIG. 5 shows a flow diagram for software used as an embodiment of the method for controlling the security check. The software to change the security features is partially executed in the Central Processing Unit 16 of FIG. 1 and partially in the operation panel software in the Read Only Memory 35. The software in the Central Processing Unit 16 would present a screen interface to a display 25 to allow the user to change the security features. The screen interface to the display 25 would allow the user to select the removable field replaceable unit 40 whose security field is to be changed, select whether the security field is to be enabled or disabled on the field replaceable unit 40, and allow the system security field to be altered. A keyboard 24 is used to allow the user the ability to enter old or new security codes or to select the removable field replaceable unit 40 to operate upon.

In further embodiments, the security code can be altered in many different ways, for example: through a communication link, through a tape, diskette, compact disk Read Only Memory, or any medium capable of storing the old and new codes. However, use of the keyboard and display for this task is the preferred embodiment.

When the user selects the operation to perform from the display in the preferred embodiment, the software code running in the Central Processing Unit 16 will pass the requirements to the operation panel code in the Read Only Memory 35 where the security checks will be done.

This feature of user changeability of the codes allows the user, usually the owner of the computer system, to control the system security (1) by enabling or disabling the security checks for each individual field replaceable unit, or (2) by changing the security code for the system itself. The method begins at start step 80 and proceeds to step 82, where the user is prompted to enter the current system security code, wherein the initial security code may be provided by the manufacturer. At step 84, the security code entered by the user is compared with the system security code 13 stored in the system non-volatile memory 12. If the code entered by the user is not compatible with that stored in the system, the program ends at step 110. Thus, no unauthorized user, or user without knowledge of the proper security code, is allowed access to the control of the security check apparatus.

If the code entered by the user is compatible with to the system security code 13, the user is prompted at step 86 with the choice of whether to change the system security code 13. This option would be taken only if all of the field replaceable unit security codes are disabled first, because if the system security code 13 is not compatible with the replaceable part security code 44, the replaceable part security code 44 cannot be altered and the replaceable unit will not work. If the user chooses to do so, they are allowed to change the code by entering it from the keyboard 24 at step 88. After this change is complete, or if the user decides not to change the system security code 13, the program proceeds to step 90, where the user is asked whether or not a field replaceable unit security code is to be changed. If no field replaceable unit is to be changed, the program ends at step 110.

If the user desires to change the security code 44 or enabling bit 46 on a field replaceable unit 40, the user is prompted to identify, by its part number or other identifying means, the field replaceable unit 40 on which the user wishes to change the security code or enabling bit, at step 92. Next, at step 94, the software checks to see if the identified field replaceable unit is identified to the system. If no such field replaceable unit exists, the change cannot be executed, and the program returns to step 90 to allow the user to choose a different field replaceable unit, if desired. If the field replaceable unit enabling bit 46 is not set in step 95, then the code goes to step 98. Otherwise, if the field replaceable unit identified by the user exists on the system, step 96 checks the identified field replaceable unit to determine whether the security code 44 on the identified unit 40 is compatible with the security code 13 on the system. If these are not compatible, the user is not allowed to change the security code or enabling bit on this field replaceable unit, and the program returns to step 90 to prompt for other field replaceable units to be changed.

If the security code 44 on the identified field replaceable unit 40 is compatible with the security code 13 on the system, the user may alter the enabling bit 46 of the identified field replaceable unit 40 at step 100 if at step 98 the user chooses to do so. Next, at step 102, the system security code 13 is copied into the security code field 44 on the identified field replaceable unit 40. At this point, the program returns to step 90, and the user is prompted for additional field replaceable units to change, if any are desired.

During an initialization stage, to enable the system security, the user is typically prompted for the system security code 13, and optionally any field replaceable units, to be enabled. The system security code 13 then may be stored in the operation panel non-volatile memory 12, and the system enabling bit 14 is set. Each field replaceable unit that was to be enabled would have a compatible system security code stored in its non-volatile memory 42 with its enable bit 46 set.

The location where the system security code resides is either fixed in the operation panel 10 or in the security code field 44 in each field replaceable unit 40. If separately stored in each field replaceable unit 40, a voting mechanism could be used, such as two-out-of-three match, to determine the correct system security code 13. In the latter embodiment, a sequence field 200 is included as shown in FIG. 3. The sequence field 200 is used to keep track of the number of times the system security code 13 is written into a security code field 44 of a field replaceable unit. The voting mechanism would then include the sequence field 200 and the security code field 44, as both must be the same in two of the three voting units. If a majority vote occurs, the system security code 13 is written into the non-matching parts, and the sequence field 200 of all parts is incremented by one. This would allow replacing a field replaceable unit 40 with a replacement part without having to contact the manufacturer to have the system security code loaded into the replacement part, or all field replaceable unit parts could be shipped with the security code disabled. In addition, this embodiment prevents the propagation of the system security code 13 into other systems, which would circumvent the security system. Further, this embodiment deals with the situation of replacing the non-volatile system memory device 12, such as when the entire op panel 10 is replaced.

The data stored in non-volatile memory of the system and field replaceable units may be stored so as to prevent discovery or tampering. If the data is kept in a clear text form, it is easy to copy or alter. In the preferred embodiment of the invention, the data stored is encrypted data, as that term is disclosed and used in pending U.S. application Ser. No. 08/322,246, METHOD AND APPARATUS FOR VALIDATING SYSTEM OPERATION, filed Oct. 12, 1994, by the assignee. The cited applications discloses an electronic signature stored with the data. Other data protection means are envisioned, so that the method disclosed in the cited application is not the exclusive means for this task. In addition, encryption of data or placing an electronic signature with the data is not a requirement of every embodiment of the present invention.

Many modifications and variations may be made in the embodiments described herein and depicted in the accompanying drawings without departing from the concept of the present invention. Accordingly, it is clearly understood that the embodiments described and illustrated herein are illustrative only and are not intended as limitations upon the scope of the present invention.

What is claimed is:

1. A method for preventing theft of replaceable computer parts comprising:

storing a part security code in a replaceable-part non-volatile memory located on each of a plurality of replaceable computer parts;

storing a system security code in a non-volatile computer system memory;

comparing the part security codes stored in the replaceable-part memories with the system security code stored in the computer system memory; and allowing the computer system to function with any particular one of the plurality of replaceable computer parts only if the part security code of the particular one part is compatible with the security code;

wherein the step of storing a part security code in the replaceable-part non-volatile memories includes the step of setting a value of an enabling bit in at least one of the replaceable-part non-volatile memories located on the plurality of replaceable parts.

2. The method of claim 1 further including the step of checking the enabling bit in at least one of the replaceable-part non-volatile memories, and comparing the part security code with the system security code only for any particular replaceable-part memories in which the enabling bit is set.

3. The method of claim 2 further including the step of allowing the system owner to set a new value of the system security code through a method including the step of first entering the old value of the system security code.

4. The method of claim 2 further including the step of allowing a system owner to set or reset the enabling bit, thereby controlling whether a given part can be used outside the owner's system, through a method including the step of first entering the system security code.

5. The method of claim 1 wherein the comparing step is automatically done upon start up of the system.

6. The method of claim 1 wherein the comparing step is automatically done upon replacement of a computer part.

7. The method of claim 5 wherein the comparing step is automatically done upon replacement of a computer part.

8. The method of claim 1 further including the step of using a voting mechanism to write the system security code into a replaceable part, as an alternative to storing a system security code in a non-volatile computer system memory.

9. A computer system having an apparatus used to compare security codes in the computer system and in each of a plurality of replaceable computer parts so that the parts cannot be stolen and used with a different system, comprising:

a replaceable-part non-volatile memory device located on each of the plurality of replaceable computer parts;

a part security code field located within the replaceable-part non-volatile memory device;

a non-volatile system memory device located on the computer system;

a system security code field located within the non-volatile system memory device;

means for allowing the computer system to function with any particular one of the plurality of replaceable computer parts only if a value stored in the particular one part security code field is compatible with a value stored in the system security code field; and a field for storing an enabling bit located within the replaceable-part non-volatile memory device;

wherein, only if the enabling bit on any particular one of the plurality of replaceable computer parts is set, a comparison is done of that particular part security code field and the system security code field.

10. The apparatus of claim 9 wherein the part security code field is a storage location adapted for holding 8 to 16 bytes of information.

11. The apparatus of claim 9 wherein the system security code field is a storage location adapted for holding 8 to 16 bytes of information.

12. The apparatus of claim 9 wherein the system security code field and part security code field are adapted for holding encrypted and electronic signature data.

13. The apparatus of claim 9 further comprising a sequence field located within the replaceable-part non-volatile memory device, wherein the sequence field is used in a voting mechanism to write the system security code into any particular one of the plurality of replaceable computer parts.

14. A computer system for comparing security codes in a system having one or more replaceable parts, comprising:

a part security code stored in a memory arrangement of each replaceable part;

a system security code stored in a memory arrangement of the computer system;

a comparing system for comparing the part security code of each replaceable part to the system security code and allowing the system to function with any particular one of the one or more replaceable parts only if the compared part security code of the particular one replaceable part is compatible with the system security code; and an enable bit stored in the memory arrangement of each replaceable part, wherein the comparing system checks whether each enable bit is set prior to comparing the corresponding part security code to the system security code.

15. The computer system of claim 14, wherein the system security code is stored in at least one of the one or more replaceable parts.

16. A method of controlling the functioning of one or more replaceable parts in a computer system, comprising:

storing a part security code and an enable bit in a memory arrangement of each replaceable part;

storing a system security code in a memory arrangement of the computer system;

determining whether the enable bit of each replaceable part is on or off;

comparing the system security code to the part security code of each replaceable part having an enable bit which is on; and operating the computer system with any particular one of the one or more replaceable parts only if the enable bit of the particular one replaceable part is off or the compared part security code of the particular one replaceable part is compatible with the system security code.

17. The method of claim 16, wherein storing the system security code includes:

storing a local system security code on each of the replaceable parts; and determining the system security code using the local system security code on each of the replaceable parts.

18. A method of controlling the security of a computer system having one or more replaceable parts, comprising:

storing a plurality of security values, including an enable bit and a part security code, on each replaceable part;

receiving a request to change one or more of the security values of a particular one of the one or more replaceable parts;

determining whether the enable bit of the particular one replaceable part is on or off;

comparing the system security code to the part security code of the particular one replaceable part only if the enable bit of the particular one replaceable part is off; and changing the requested one or more of the security values only if the enable bit of the particular one replaceable part is off or the compared part security code of the particular one replaceable part is compatible with the system security code.

* * * * *